May 23, 1933.    H. R. CRAGO    1,910,202
ELECTRIC REGULATING SYSTEM
Filed Dec. 31, 1931
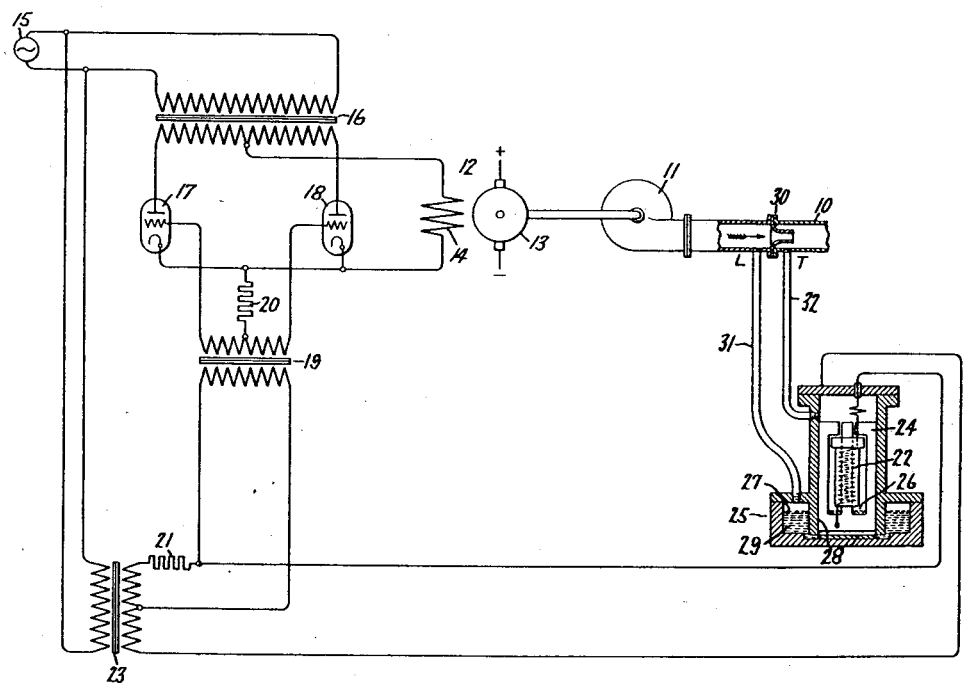
Inventor:
Harry R. Crago,
by Charles E. Mueller
His Attorney.

Patented May 23, 1933

1,910,202

UNITED STATES PATENT OFFICE

HARRY R. CRAGO, OF SCHENECTADY, NEW YORK, ASSIGNOR TO GENERAL ELECTRIC COMPANY, A CORPORATION OF NEW YORK

ELECTRIC REGULATING SYSTEM

Application filed December 31, 1931. Serial No. 584,052.

My invention relates to electric regulating systems and more particularly to such systems including an electric valve for regulating an operating condition of a device or electric circuit.

Heretofore it has been proposed to regulate the operating condition of an electric circuit or a device by means of an electric valve energized from an alternating current circuit and impressing upon the grid of the electric valve an alternating potential variable in phase with respect to its anode potential. My invention relates to an electric regulating system of this type and, while it is of general application, it is particularly suitable for controlling the flow of fluid delivered by a motor driven pump.

It is an object of my invention, therefore, to provide an improved electric regulating system including an electric valve for regulating an operating condition of an electric circuit or a device which is simple and reliable in operation, and by means of which an operating condition may be regulated to any degree of accuracy desired.

It is another object of my invention to provide an improved translating circuit for producing an alternating potential variable in phase with respect to that of an alternating current source, which is of general application, but which is particularly suitable for use in connection with my improved electric regulating circuit.

In accordance with one embodiment of my invention, a fluid flow is maintained in a fluid translating circuit by means of a motor driven pump. Either the field or armature winding of the motor is energized from a source of alternating current through a pair of electric valves for controlling the energization of the winding. There is provided an impedance phase shifting circuit energized from the alternating current source for producing an alternating potential variable in phase with respect to that of the source. This impedance phase shifting circuit includes an inductive winding and a conductive fluid surrounding a portion of the magnetic circuit of the winding. The inductive winding and its fluid is enclosed within a chamber and the level of the fluid in this chamber is controlled in response to the flow of fluid in a fluid-translating circuit by any well known means, although I prefer to use an arrangement of the type disclosed and claimed in United States Letters Patent No. 1,560,951, granted November 10, 1925, upon the application of L. W. Thompson et al. By means of such an arrangement the fluid-translating circuit may be given any desired regulation characteristics.

For a better understanding of my invention, together with other and further objects thereof, reference is had to the following description taken in connection with the accompanying drawing and its scope will be pointed out in the appended claims. The single figure of the accompanying drawing illustrates an embodiment of my invention for maintaining constant the flow of fluid in a fluid-translating circuit.

Referring now to the drawing, there is illustrated an arrangement for maintaining a fluid flow in the fluid-translating circuit 10. This apparatus comprises a pump 11 driven by a direct current motor 12 provided with an armature winding 13 connected to any suitable source of direct current, as illustrated, and a field winding 14 energized from a source of alternating current 15 through a transformer 16 and a pair of electric valves 17 and 18, connected in the conventional manner for securing full wave rectification. The electric valves 17 and 18 are each provided with an anode, a cathode and a control grid, and may be of any of the several types well known in the art, although I prefer to use valves of the vapor electric discharge type. The grids of the valves 17 and 18 are connected to the common cathode circuit through opposite halves of the secondary winding of a grid transformer 19 and a current limiting resistor 20. In order to control the conductivity of the valves 17 and 18, there is provided an impedance phase shifting circuit comprising a resistor 21 and an inductive winding 22 serially energized from the alternating current source 15 through a transformer 23, the primary winding of grid transformer 19 being connected between the electrical midpoint of the secondary winding of the transformer 23 and the junction between a resistor 21 and reactor 22. The inductive winding 22 is preferably provided with a magnetic core member 24 and this core member is partially surrounded by a body of conductive fluid, the level of which may be determined by a condition of flow in the translating circuit 10 by any of the several means well known in the art. By way of example, however, I have illustrated a specific arrangement for controlling the fluid level similar to that described and claimed in the aforementioned patent of Thompson et al., comprising a vessel 25 in which the inductive winding 22 and its magnetic core member 24 are mounted. The vessel 25 is provided with an inner chamber 26 and an outer chamber 27 interconnected beneath a baffle member 28. A conductive fluid, such for example, as liquid mercury, fills the lower portion of the chambers 26 and 27, surrounding the lower portion of the magnetic core member 24. A Venturi nozzle is included in the fluid-translating circuit 10, and the leading and trailing sides of this nozzle communicate through the tubes 31 and 32 with the chambers 27 and 26, respectively. In this way, the fluid level in the chambers 26 and 27, interconnected beneath the baffle 28, is determined by the quantity of fluid passing in the translating circuit 10. However the broad feature of regulating an operating condition of an electric circuit or a device by means of an electric valve and an impedance phase shifting circuit including an inductive winding provided with a closed circuit conductive element in its magnetic path forms no part of my present invention, but is disclosed and broadly claimed in the copending application of L. W. Thompson et al., Ser. No. 584,076, filed December 31, 1931, and assigned to the same assignee as the present application.

In explaining the operation of the above described apparatus, it will be assumed that, initially, the system is in a state of equilibrium and that it is desired to maintain constant the quantity of fluid flowing through the translating circuit 10. If the fluid passing the Venturi nozzle 30 should tend to increase, due to a decrease in the back pressure in the translating circuit 10 or for any other cause, the pressure differential across this nozzle will increase, as is well understood by those skilled in the art, and the level of the fluid in the chamber 26 will rise, thus including a greater portion of the magnetic circuit 24 of the inductive winding 22. The conductive fluid surrounding this magnetic core member acts as a short circuiting secondary member and, as it rises and includes a greater portion of this magnetic circuit, the effective impedance of the inductive winding 22 is decreased. A decrease in the impedance of the winding 22 causes the potential applied to the primary winding of grid transformer 19 by the impedance phase-shifting circuit comprising the resistor 21 and the winding 22 to advance in phase, so that each of the electric valves 17 and 18 is rendered conductive at an earlier point in its respective half cycles of positive anode potential, and the excitation of the field winding 14 is increased. As the field excitation of the motor 12 is increased the motor slows down and with it the pump 11, so that the pressure under which fluid is delivered to the system 10 is diminished and the flow is returned to its normal value. Obviously, upon the occurrence of a decrease in the flow through the Venturi nozzle 30, the reverse operation will take place.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. In an electric regulating system, means having an operating condition to be regulated, means for regulating said operating condition including an electric valve and a source of alternating current, means for varying the conductivity of said valve including an inductive winding, a conductive liquid which includes a portion of the magnetic circuit of said winding, and means responsive to said operating condition for controlling the level of said liquid.

2. In an electric regulating system, means having an operating condition to be regulated, means for regulating said operating condition including a source of alternating current and an electric valve provided with an anode, a cathode, and a control grid, said anode and cathode being included in circuit with said source, means for energizing said grid from said source including an inductive winding provided with a magnetic core member, a conductive liquid surrounding a portion of said core member, and means responsive to said operating condition for controlling the level of said liquid.

3. In an electric regulating system, means having an operating condition to be regulated, means for regulating said operating condition including a source of alternating current and an electric valve provided with an anode, a cathode, and a control grid, said anode and cathode being included in circuit with said source, a resistor and a reactor serially energized from said source for producing dephased potentials, said reactor being provided with a magnetic core member, a conductive liquid surrounding a portion of said core member, a circuit for energizing said grid from said dephasing circuit, and means responsive to said operating condition for controlling the level of said liquid.

4. In a fluid regulating system, the combination of a fluid-translating circuit, means for maintaining a flow in said circuit, a dynamo-electric machine including field and armature windings for actuating said means, means for energizing one of said windings including a source of alternating current and an electric valve, means for varying the conductivity of said valve including an inductive winding, a conductive liquid which includes a portion of the magnetic circuit of said winding, and means responsive to the flow in said translating circuit for controlling the level of said liquid.

In witness whereof, I have hereunto set my hand.

HARRY R. CRAGO.